(12) United States Patent
Choi et al.

(10) Patent No.: US 11,247,187 B2
(45) Date of Patent: Feb. 15, 2022

(54) PICKERING EMULSION AND METHOD OF PREPARING THE SAME

(71) Applicant: KOREA ADVANCED INSTITUTE OF SCIENCE AND TECHNOLOGY, Daejeon (KR)

(72) Inventors: Siyoung Choi, Daejeon (KR); Kyu Han Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 206 days.

(21) Appl. No.: 15/576,232

(22) PCT Filed: Apr. 25, 2016

(86) PCT No.: PCT/KR2016/004289
§ 371 (c)(1),
(2) Date: Nov. 21, 2017

(87) PCT Pub. No.: WO2017/018637
PCT Pub. Date: Feb. 2, 2017

(65) Prior Publication Data
US 2018/0141015 A1   May 24, 2018

(30) Foreign Application Priority Data
Jul. 28, 2015   (KR) .......................... 10-2015-0106317

(51) Int. Cl.
*B01F 17/00*   (2006.01)
*C08J 3/03*   (2006.01)
(Continued)

(52) U.S. Cl.
CPC ........ *B01F 17/0085* (2013.01); *B01F 3/0807* (2013.01); *B01F 17/005* (2013.01);
(Continued)

(58) Field of Classification Search
CPC .. B01F 2003/0823–0849; B01F 3/0807–0819; B01F 2003/0826;
(Continued)

(56) References Cited

U.S. PATENT DOCUMENTS 6,709,662 B1 * 3/2004 Gers-Barlag ............ A61K 8/06
424/400
2005/0266055 A1 * 12/2005 Stiller .................. A61K 8/0208
424/443
(Continued)

FOREIGN PATENT DOCUMENTS

CN   104774285 A   *   7/2015
CN   105289557 A   *   2/2016
(Continued)

OTHER PUBLICATIONS

Machine Translation of CN105289557A. Feb. 3, 2016. (Year: 2016).*
(Continued)

*Primary Examiner* — Stephen E Rieth
(74) *Attorney, Agent, or Firm* — McCoy Russell LLP

(57) ABSTRACT

Provided are a pickering emulsion including: 0.01-20 wt % of particles having an average particle diameter of 10 nm-100 μm, and 0.01-20 wt % of a non-ionic water-soluble polymer, wherein the particles are positioned on an oil droplet surface, and a method of preparing the same.

7 Claims, 3 Drawing Sheets

(51) Int. Cl.
  *B01F 3/08* (2006.01)
  *C08J 3/02* (2006.01)
  *C08J 3/21* (2006.01)
  *C08J 9/28* (2006.01)

(52) U.S. Cl.
  CPC ...... *B01F 17/0007* (2013.01); *B01F 17/0028* (2013.01); *C08J 3/02* (2013.01); *C08J 3/03* (2013.01); *C08J 3/212* (2013.01); *C08J 9/283* (2013.01); *B01F 2003/0826* (2013.01); *B01F 2003/0842* (2013.01); *B01F 2003/0846* (2013.01); *C08J 2323/08* (2013.01); *C08J 2323/12* (2013.01); *C08J 2329/04* (2013.01); *C08J 2333/26* (2013.01); *C08J 2339/06* (2013.01)

(58) Field of Classification Search
  CPC ........... C08J 3/02–05; A61K 8/06–068; A61K 9/107–1075
  See application file for complete search history.

(56) References Cited

U.S. PATENT DOCUMENTS

| | | | |
|---|---|---|---|
| 2008/0220176 A1 | 9/2008 | Carlblom et al. | |
| 2010/0261803 A1 | 10/2010 | Bismarck et al. | |
| 2010/0292079 A1* | 11/2010 | Fowler | A01N 25/04 504/101 |
| 2010/0316684 A1* | 12/2010 | Daniels | A61K 8/731 424/401 |
| 2014/0073706 A1* | 3/2014 | Capron | B01F 3/08 514/781 |
| 2014/0242016 A1 | 8/2014 | Binks et al. | |
| 2014/0329735 A1* | 11/2014 | Bara | A61K 8/25 512/3 |
| 2014/0343170 A1* | 11/2014 | Sugiyama | A61Q 19/00 514/772.4 |
| 2015/0273420 A1* | 10/2015 | Capron | C08J 9/28 514/777 |
| 2016/0213595 A1* | 7/2016 | Bouarfa | A61K 8/375 |

FOREIGN PATENT DOCUMENTS

| | | | |
|---|---|---|---|
| JP | 2014024818 A * | 2/2014 | |
| KR | 1020100031097 A | 3/2010 | |
| KR | 1020140007359 A | 1/2014 | |
| WO | 2013076673 A1 | 5/2013 | |
| WO | 2014055539 A1 | 4/2014 | |
| WO | WO-2014060697 A1 * | 4/2014 | ............... C08J 9/28 |

OTHER PUBLICATIONS

Machine Translation of CN104774285A. Jul. 15, 2015. (Year: 2015).*
Hua, Y. et al. Hydrophilic polymer foams with well-defined open-cell structure prepared from pickering high internal phase emulsions. J. Poly. Sci. Part A: Poly. Chem. 2013, 51, 2181-2187. (Year: 2013).*
Tween 85 Information. IRO Group Inc. https://www.irochemical.com/product/Surfactants/Tween-85.htm. As viewed on Nov. 6, 2019. (Year: 2019).*
Ikem, V. O. Tailoring the mechanical performance of highly permeable macroporous polymers synthesized via pickering emulsion templating. Soft Matter, 2011, 7, 6571-6577. (Year: 2011).*
PVP and more: Typical data and properties of LUVITEC, LUVICROSS, and COLLACRAL VAL. BASF. Apr. 2009. (Year: 2009).*
Polyethylene glycol material safety data sheet. MetLab Corporation. Jan. 2018. (Year: 2018).*
Devanand, K. et al. Asymptotic behavior and long-range interactions in aqueous solutions of poly(ethylene oxide). Macromolecules, 1991, 24, 5943-5947. (Year: 1991).*
Polyglykol 400 safety data sheet. Clariant. May 9, 2018. (Year: 2018).*
PEO: Water-soluble thermoplastic resin. Sumitomo Seika Chemicals Co., Ltd. Sep. 29, 2009. (Year: 2009).*
Miglyol 812 material safety data sheet. Caelo. Nov. 26, 2018. (Year: 2018).*
Machine Translation of JP2014-024818A. Feb. 6, 2014. (Year: 2014).*
Ling K. et al. A colorimetric method for the molecular weight determination of polyethylene glycol using gold nanoparticles. Nanoscale Research Letters, 2013, 8, 538. (Year: 2013).*
ISA Korean Intellectual Property Office, International Search Report Issued in Application No. PCT/KR2016/004289, Jul. 29, 2016, WIPO, 2 pages.

* cited by examiner

PICKERING EMULSION AND METHOD OF PREPARING THE SAME

CROSS-REFERENCE TO RELATED APPLICATIONS

The present application is a U.S. National Phase of International Patent Application Serial No. PCT/KR2016/004289 entitled "PICKERING EMULSION AND METHOD OF PREPARING THE SAME," filed on Apr. 25, 2016. International Patent Application Serial No. PCT/KR2016/004289 claims priority to Korean Patent Application No. 10-2015-0106317, filed on Jul. 28, 2015. The entire contents of each of the above-cited applications are hereby incorporated by reference for all purposes.

TECHNICAL FIELD

The present invention relates to a pickering emulsion, and a method of preparing the same.

BACKGROUND ART

An emulsion is a system in which oil drops are dispersed in water, or water drops are dispersed in oil, and particularly, a high internal phase emulsion (HIPE) refers to an emulsion system in which dispersed drops account for 74 vol % or more based on the total volume of the emulsion. This high internal phase emulsion generally has a very high specific surface area by volume as compared with a general emulsion, and thus, may be usefully utilized, and also may be used as a template so that various porous materials are prepared, and utilized in general industry fields such as a filter, a sensor, an adsorbent, a catalyst support and the like.

Despite these benefits, the high internal phase emulsion is energetically very unstable, and thus, all dispersed drops are likely to be finally combined to cause phase separation into a water layer and an oil layer.

In order to prevent this, a method of adding an excess amount of a surfactant, or adding colloid particles which are positioned at an interface of a dispersed phase to lower interfacial tension, thereby stabilizing the emulsion system, has been used.

However, in case of adding an excess amount of a surfactant, it is difficult to control the size of dispersed phase drops, and when producing a foam structure using the emulsion, it is difficult to remove the added surfactant by wash, and there is a limitation on material selection. When adding only typical colloid particles, it is very difficult to prepare an emulsion having a dispersed phase volume of 70 vol % or more based on the total volume of the emulsion, and thus, it was impossible to prepare a high internal phase emulsion with only the colloid particles.

In order to overcome this, surface-treated colloid particles, or specially prepared particles were used, thereby preparing the high internal phase emulsion, however, in the case of using such method, time-consuming and complicated processes, such as complicated chemical surface treatment, or preparation of special particles using a special polymer should be carried out, and thus, commercialization of the high internal phase emulsion was difficult.

Korean Patent Laid-Open Publication No. 10-2014-0007359 which was previously known suggests a method of preparing an oil-in-water type pickering emulsion for conductive coating including water, water-incompatible solvent and three dimensionally stabilized silver nanoparticles.

However, in order to obtain the three dimensionally stabilized silver nanoparticles first, a cumbersome surface treatment process of adding a dispersant to silver nanoparticle dispersion, thereby imparting a positive or negative surface charge to the surface of the silver nanoparticles, should be preceded. Further, despite the surface treatment process, an emulsion having a volume ratio of an organic solvent:water being about 1:2-4 is produced, and thus, the volume ratio of an oil phase in an oil-in-water type pickering emulsion is only up to 33 vol % based on the total volume of the emulsion. Thus, it was impossible to provide a high internal phase emulsion.

In addition, Korean Patent Laid-Open Publication No. 10-2010-0031097 relates to a foam preparation including an emulsifier-free emulsion, and specifically, suggests a foam preparation including an oil-in-water type emulsion not essentially containing a general emulsifier (surfactant) (or if it contains, 0.5 wt % or less based on the total volume of the emulsion). More specifically, Korean Patent Laid-Open Publication No. 10-2010-0031097 suggests a pickering emulsion including fine particle material having a particle size of 1 to 200 nm, an oil phase and a water phase.

However, it was very difficult to greatly increase the volume of the dispersed phase in the emulsion only with the surface-untreated fine particle materials, and the stability of the emulsion was also lowered. Specifically, the pickering emulsion suggested in Korean Patent Laid-Open Publication No. 10-2010-0031097 includes 10 to 50 wt %, preferably 25 to 35 wt % of an oil phase, and if the specific gravity of the oil phase is 1 g/cm3, the oil phase may account for up to 50 vol % based on the total volume of the emulsion, and if the specific gravity is significantly lowered to 0.5 g/cm3, the oil phase accounts for only up to 66 vol %. Thus, it was impossible to provide a high internal phase emulsion.

Thus, the development of an emulsion which is a high internal phase emulsion prepared by a very simple method, while having a stable dispersed phase, and a method of preparing the same is currently needed.

RELATED ART DOCUMENT

Patent Document

Korean Patent Laid-Open Publication No. 10-2014-0007359 (Jan. 17, 2014)

Korean Patent Laid-Open Publication No. 10-2010-0031097 (Mar. 19, 2010)

DISCLOSURE

Technical Problem

An object of the present invention is to provide a pickering emulsion having a stable high internal phase prepared by a very simple method, and a method of preparing the same.

Technical Solution

In one general aspect, a pickering emulsion includes 0.01-20 wt % of particles having an average particle diameter of 10 nm-100 μm, and 0.01-20 wt % of a non-ionic water-soluble polymer, based on a total weight of the emulsion, wherein the particles are positioned on an oil droplet surface.

In another general aspect, a method of preparing a pickering emulsion includes a) dispersing particles having an average particle diameter of 10 nm-100 μm in a water phase to prepare a dispersion; b) adding an oil phase to the top of the dispersion to prepare a solution separated into a water phase layer and an oil phase layer; c) adding a non-ionic water-soluble polymer to the water phase layer; and d) mixing the water phase layer to which the non-ionic water-soluble polymer is added, and the oil phase layer to prepare the emulsion.

In still another general aspect, a method of preparing a foam structure includes preparing a high internal phase pickering emulsion including 0.01-20 wt % of particles having an average particle diameter of 10 nm-100 μm, and 0.01-20 wt % of a non-ionic water-soluble polymer based on a total weight of the emulsion, the emulsion having an oil phase being a dispersed phase, and a water phase being a continuous phase, the oil phase being included as a dispersed phase at 74 vol % or more based on a total volume of the emulsion; curing the non-ionic water-soluble polymer in the high internal phase pickering emulsion to be polymerized; and removing liquid components forming the continuous phase with the dispersed phase in the high internal phase pickering emulsion.

In still another general aspect, a foam structure is prepared by the method of preparing a foam structure.

Advantageous Effects

The pickering emulsion according to the present invention has a very stable dispersed phase, and may have a high dispersed phase having a large volume of the dispersed phase. Further, even after a long time has elapsed, phase separation does not occur very often.

Further, as particles may be used without limiting the kind thereof, surface-treated particles or specially prepared particles may not be used, and due to this, the particles may be easily supplied with a low price, and thus, through an economically feasible and very simple method, a high internal phase pickering emulsion may be obtained.

DESCRIPTION OF DRAWINGS

The above and other objects, features and advantages of the present invention will become apparent from the following description of preferred embodiments given in conjunction with the accompanying drawings, in which.

BEST MODE

Figure 1:
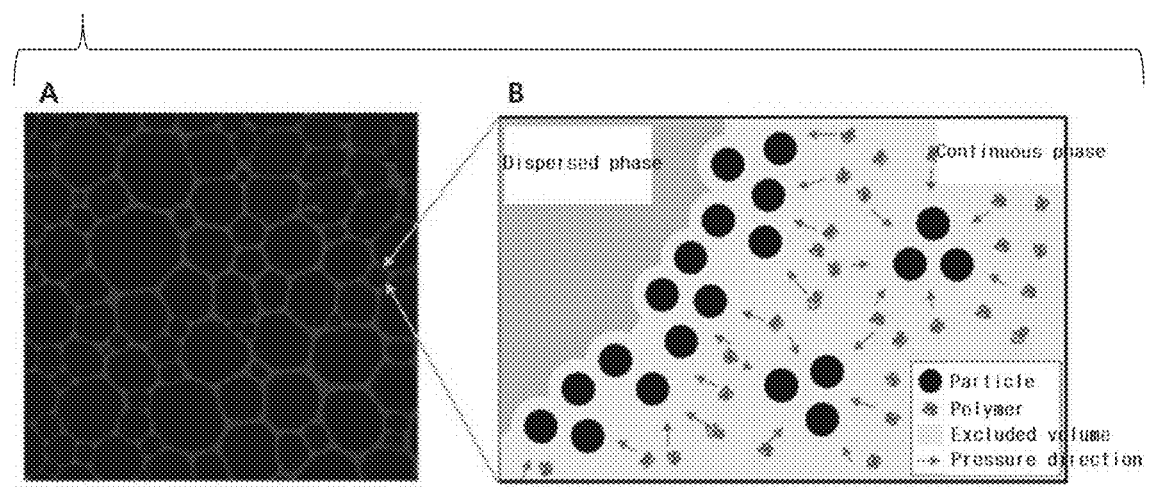
FIG. 1 illustrates an emulsion system in A, and depletion pressure in B.

Hereinafter, the oil-in-water type pickering emulsion and the method of preparing the same of the present invention will be described in detail with reference to the accompanying drawings. The drawings to be provided below are provided by way of example so that the idea of the present invention can be sufficiently transferred to those skilled in the art to which the present invention pertains. Therefore, the present invention is not limited to the drawings provided below but may be modified in many different forms. In addition, the drawings suggested below will be exaggerated in order to clear the spirit and scope of the present invention.

Technical terms and scientific terms used herein have the general meaning understood by those skilled in the art to which the present invention pertains unless otherwise defined, and a description for the known function and configuration obscuring the present invention will be omitted in the following description and the accompanying drawings.

As described in Background Art above, a general high internal phase emulsion system had a problem of easy occurrence of phase separation. As a method for preventing this problem, a method of using surface-treated colloid particles or specially prepared particles has been suggested, however, such method should undergo time-consuming and complicated processes, such as complicated chemical surface treatment, or preparation of special particles using a special polymer, and thus, commercialization thereof is difficult.

Thus, as a result of the present inventors' extensive study on a high internal phase emulsion, a pickering emulsion having a stable dispersed phase of a large volume may be obtained, only by preparing an emulsion by adding particles in a certain size range which are not surface-treated at all, and a non-ionic water-soluble polymer, without adding a surfactant, surface-treated colloid particles or specially prepared particles. That is, as particles may be used without limiting the kind thereof, surface-treated particles or specially prepared particles may not be used, and due to this, the particles may be easily supplied with a low price, and thus, through an economically feasible and very simple method, a high internal phase pickering emulsion may be obtained.

Specifically, the present invention according to an exemplary embodiment relates to a pickering emulsion including 0.01-20 wt % of particles having an average particle diameter of 10 nm-100 μm, and 0.01-20 wt % of a non-ionic water-soluble polymer, based on the total weight of the emulsion, wherein the particles are positioned on an oil droplet surface.

As described above, the prepared emulsion may have a stable dispersed phase, only by adding particles having an average particle diameter of 10 nm-100 μm which are not surface-treated at all, together with a non-ionic water-soluble polymer. It is more preferred that the particles have an average particle diameter of 50 nm-30 μm, more preferably 100 nm-10 μm, for more effective stabilization of the dispersed phase by inhibiting phase separation. In particular, even in the case that 0.01-20 wt % of the particles, and 0.01-20 wt % of the non-ionic water-soluble polymer, based on the total weight of the emulsion are added to increase the total volume of the dispersed phase, the stability may be maintained, thereby obtaining the high internal phase emulsion. It is preferred to add 0.05-10 wt % of the particles, and 0.05-10 wt % of the non-ionic water-soluble polymer based on the total weight of the emulsion, for increasing the stability of the dispersed phase, and it is more preferred to add 0.1-5 wt % of the particles, and 0.1-5 wt % of the non-ionic water-soluble polymer based on the total weight of the emulsion.

Specifically, the pickering emulsion according to an exemplary embodiment may be an oil-in-water type pickering emulsion having an oil phase being a dispersed phase, and a water phase being a continuous phase. That is, the emulsion may have a form that oil droplets (oil drops) are dispersed in a water phase.

As such, a very stable emulsion which does not undergo phase separation even after a long time may be obtained by having an oil phase as a dispersed phase. This is because when mixing an oil layer and a water layer to form an oil phase being a dispersed phase, and a water phase being a continuous phase, a non-ionic water-soluble polymer dissolved in the water phase causes depletion pressure, which allows particles to be adsorbed well on the surface (interface) of an oil droplet so as to lower interfacial tension, thereby inhibiting phase separation caused by the interfacial tension.

Herein, the depletion pressure refers to force applied to relatively large-sized particles or oil droplets by relatively small-sized non-ionic water-soluble polymers, in an emulsion in which particles having different sizes are dispersed, as illustrated in B of FIG. 1, i.e., force generated when the spacing between large-sized particles and/or oil droplets becomes small as compared with small-sized non-ionic water-soluble polymers, which causes imbalance of osmotic pressure. That is, since the spacing between the particles and/or oil droplets is smaller than the size of the non-ionic water-soluble polymer, the non-ionic water-soluble polymer may not be positioned within the spacing, and thus, the particles positioned on an oil droplet surface may be adsorbed well thereon even after a long time, by the force of the non-ionic water-soluble polymers to be moved into the spacing.

In order to generate such depletion pressure, it is preferred to adjust the volumes of the oil phase and water phase, together with the contents of the particles and non-ionic water-soluble polymers. Specifically, it is preferred that the oil phase has a larger volume than the water phase, and more preferably 74 vol % or more, still more preferably 80 vol % or more, based on the total volume of the emulsion is the oil phase. Herein, the upper limit is not particularly limited, but considered to be the maximum volume of the oil phase which may stably form the oil-in-water type pickering emulsion. For example, the oil phase may account for 95 vol % or less, but not limited thereto.

Figure 3:
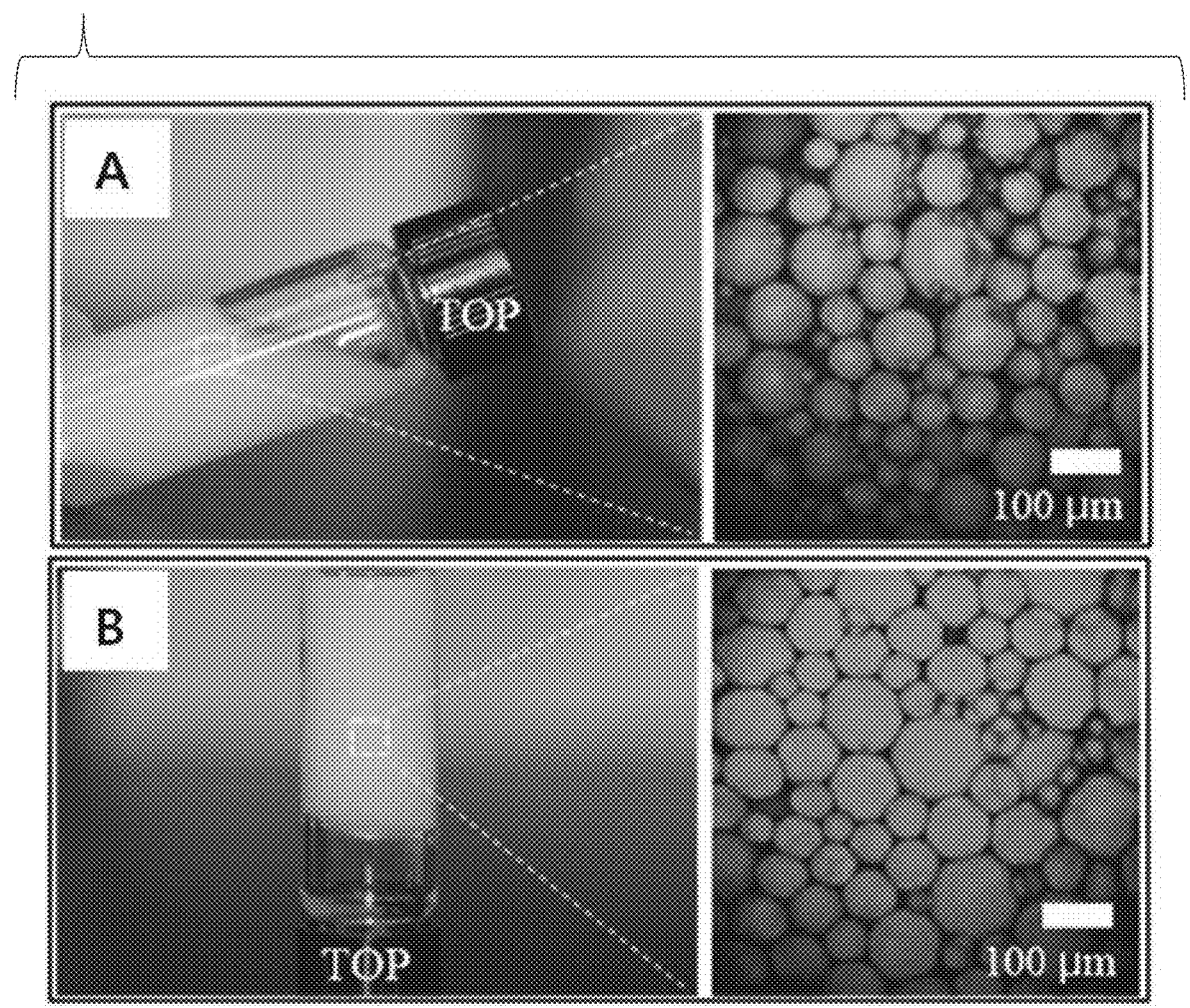
FIG. 3 is a confocal micrograph of a pickering emulsion according to an exemplary embodiment of the present invention (A), and a confocal micrograph of a high internal phase pickering emulsion according to another exemplary embodiment of the present invention (B), respectively.

By way of example, when an emulsion contains the oil phase at 74 vol % or more based on the total volume of the emulsion, the emulsion may be decided to be a high internal phase emulsion, and in this case, the oil phase may be, as illustrated in B of FIG. 3, oil droplets in an angular shape. It is considered that as the oil phase fully occupies the emulsion, each spacing between the oil droplets is narrowed so that the oil droplets apply pressure to each other, thereby transforming the shape of the oil droplets from a sphere shape to an angular shape.

Specifically, referring to each component, the shape of the particles is not particularly limited, but spherical particles are preferred, since they may be stably adsorbed on the surface of the oil droplets, and maintain the state of being adsorbed on the surface well by the depletion pressure. As to the size, as described above, the particle may have an average particle diameter of 10 nm-100 μm, more preferably 50 nm-30 μm, and still more preferably 100 nm to 10 μm, for more effective stabilization of the dispersed phase by inhibiting phase separation. The kind of particles is not particularly limited as long as they are not dissolved in the water phase, and adsorbed on the surface of the oil droplets, and may be selected depending on the use of the emulsion. The particles may be metal particles, non-metal particles, or a mixture thereof. The metal particles may be any one or two or more selected from the group consisting of Groups 3 to 12 transition metals, Groups 13 to 16 post-transition metals, and oxides thereof, and by way of example, the transition metal may be titanium (Ti), vanadium (V), manganese (Mn), iron (Fe), cobalt (Co), nickel (Ni), copper (Cu), niobium (Nb), molybdenum (Mo), ruthenium (Ru), rhodium (Rh), palladium (Pd), silver (Ag), hafnium (Hf), tantalum (Ta), tungsten (W), iridium (Ir), platinum (Pt), gold (Au), lanthanum (La), cerium (Ce), or the like, and the post-transition metal may be aluminum (Al), gallium (Ga), indium (In), tin (Sn), thallium (Tl), lead (Pb), bismuth (Bi), or the like. The kind of non-metal particles is not limited as long as the particles are not metal but solid, and as a non-limiting example thereof, the particles may be any one or two or more selected from the group consisting of polymer particles such as water-insoluble polystyrene, polyester, polyether, polycarbonate, polyamide, polyimide and polyurethane, silica, solid glass, ceramic particles, and the like.

The non-ionic water-soluble polymer is not particularly limited as long as it is non-ionic, and dissolves well in water, as represented by the name. For example, any one or two or more selected from the group consisting of polyalkylene glycol such as polyethylene glycol, polypropylene glycol and polyethylene propylene glycol, polyoxypropylene glycol, polyethylene glycol diacrylate, polyethylene glycol dimethyl ether, polyvinyl alcohol, polyvinyl pyrrolidone, polyacrylamide and the like may be used.

In addition, it is preferred that the non-ionic polymer according to an exemplary embodiment has a weight average molecular weight of 100-1,000,000 g/mol, more preferably 500-100,000 g/mol, and still more preferably 1,000-30,000 g/mol. Within this range, the depletion pressure may be effectively generated, thereby allowing the particles to be adsorbed well on the droplet surface.

The water phase according to an exemplary embodiment is not mixed with the oil phase well, and may be used without a particular limitation as long as it dissolves the non-ionic water-soluble polymer well, however, it is preferred to use water such as purified water or distilled water.

The oil phase according to an exemplary embodiment may be varied depending on the use of the emulsion to be desired, and be used without a particular limitation as long as it is generally used in the art. Specifically, the oil phase is not mixed well with the water phase, and may be an oil, an organic solvent or a mixture thereof which is liquid at a room temperature (20-25° C.) under atmospheric pressure (1 atm). The oil may be any one or two or more selected from the group consisting of an ester-based oil, a hydrocarbon-based oil, a silicone-based oil and the like, and as a more specific and non-limiting example, the ester-based oil may be hexyl laurate, dicaprylyl carbonate, diisostearyl malate, butylene glycol dicaprylate/dicarprate, cetylethyl hexanoate, triethylhexanoin, dicetearyl dimer dilinoleate and the like, the hydrocarbon-based oil may be polybutene, hydrogenated polyisobutene or the like, and the silicone-based oil may be phenyl trimethicone or dimethicone. The organic solvent may be C6-C20 hydrocarbon, and preferably C8-C16 aliphatic hydrocarbon. As a more specific and non-limiting example, it may be any one or two or more selected from the group consisting of n-nonane, n-decane, n-undecane, n-dodecane, n-tetradecane, n-pentadecane, n-hexadecane and the like.

As described above, the pickering emulsion according to the present invention is an oil-in-water type pickering emulsion prepared by including 0.01-20 wt % of particles having an average particle diameter of 10 nm-100 μm, and 0.01-20 wt % of a non-ionic water-soluble polymer, and may have a very stable dispersed phase which does not undergo phase separation even after a long time, without adding a surfactant, surface-treated colloid particles, or specially prepared particles.

A method of preparing the pickering emulsion as described above may be carried out by including a) dispersing particles having an average particle diameter of 10 nm-100 μm in a water phase to prepare a dispersion; b) adding an oil phase and a non-ionic water-soluble polymer to the dispersion to prepare a secondary dispersion; and c) mixing the secondary dispersion to prepare an emulsion.

Herein, since the kinds, sizes, contents and the like of the water phase, oil phase, particles and non-ionic water-soluble polymer are as described above for the pickering emulsion, detailed description of each component will be omitted.

First, the method of preparing a pickering emulsion according to an exemplary embodiment of the present invention may be carried out by a) dispersing particles having an average particle diameter of 10 nm-100 μm in a water phase to prepare a dispersion. Herein, the water phase may be used at 20-100 vol % based on the total volume of the water phase for preparing the emulsion, and more preferably the particles may be dispersed in 40-80 vol % of the water phase. This is for injecting the non-ionic water-soluble polymer in the form of being dissolved in the water phase when adding the non-ionic water-soluble polymer later in step b), and thus, the non-ionic water-soluble polymer may be present in the form of being dissolved well in the emulsion when preparing the pickering emulsion, by dissolving the non-ionic water-soluble polymer in the water phase and adding it. Accordingly, the non-ionic water-soluble polymer in the form of being dissolved may effectively apply the depletion pressure to the particles and oil droplets, thereby allowing the particles to be adsorbed well on the oil droplet surface, and improving the dispersion stability of the emulsion.

Next, the method of preparing a pickering emulsion according to an exemplary embodiment of the present invention may be carried out by b) adding an oil phase and a non-ionic water-soluble polymer to the dispersion to prepare a secondary dispersion. As such, the particles are preferentially added to the water phase to be dispersed, and then the non-ionic water-soluble polymer is added to the water phase in step a), thereby dispersing the particles dispersed in the water phase effectively well without agglomeration. Further, in the subsequent mixing process, the particles may be dispersed evenly well without agglomeration on the oil droplet surface, and the non-ionic water-soluble polymer dissolved in the water phase may apply the depletion pressure to the oil droplets and particles, thereby preparing the pickering emulsion having excellent stability. However, differently from the preparation method of the present invention, when the particles and the non-ionic water-soluble polymer are added together, the depletion pressure is applied to the particles by the non-ionic water-soluble polymer before the particles are dispersed, and thus, the particles may agglomerate together and not be dispersed well, and the stability and preparation efficiency of the pickering emulsion may be lowered. Accordingly, it is preferred to carry out step b) after step a) in terms of implementing the pickering emulsion having excellent stability. However, in step b), the addition of the oil phase and non-ionic water-soluble polymer may be carried out in any order. That is, the oil phase may be added to the top of the dispersion first, or the non-ionic water-soluble polymer may be added to the dispersion first.

Next, the method of preparing a pickering emulsion according to an exemplary embodiment of the present invention may be carried out by c) mixing the secondary dispersion to prepare an emulsion. The mixing method for preparing the emulsion may not be particularly limited as long as it is generally used in the art, and specifically, the pickering emulsion may be prepared by applying the approximately medium energy of emulsification applied during a general emulsion mixing process, by low-energy emulsification applying lower energy than the approximately medium energy, or by high-energy emulsification applying higher energy than the approximately medium energy. In particular, in case that the mixing process is carried out in a manner of a high-energy emulsification, the high internal phase pickering emulsion may be prepared only by one mixing process.

As a specific and non-limiting example, the mixing method may be carried out by mechanical stirring, high speed shearing, ultrasonic emulsification, high-pressure homogenization, a microfluidizer, or the like. Herein, the conditions of the mixing such as time may be varied with the mixing method, however, as a non-limiting specific example, when the mixing is carried out by mechanical stirring, it is preferred to carry out mixing at 500-10,000 rpm for 10 secs-5 mins, more preferably at 1,000-5,000 rpm for 30 secs-3 mins, for homogeneous mixing of the oil phase and water phase.

Further, the method of preparing a pickering emulsion according to an exemplary embodiment of the present invention may further include d) additionally adding an oil phase to the emulsion and carrying out mixing, once or twice or more. That is, after preparing a primary emulsion, the oil phase may be further added to the primary emulsion and mixed, thereby increasing the volume of the oil phase in the total volume of the emulsion, and dispersing the oil phase more stably. Specifically, in this way, the oil phase accounts for 74 vol % or more based on the total volume of the emulsion, and a high internal phase pickering emulsion having the properties like a solid with significantly lowered flowability may be prepared. In particular, after preparing the primary emulsion, the step of additionally adding the oil phase and performing mixing may be carried out once or twice or more, thereby preparing a highly stabilized high internal phase pickering emulsion, even with a low-energy emulsification process which applies lower energy than a conventional mixing process for preparing a high internal phase emulsion.

As described above, as the pickering emulsion prepared according to an exemplary embodiment of the present invention has a very stable dispersed phase which does not undergo easy phase separation even after a long time, without adding a surfactant, surface-treated colloid particles or specially prepared particles, it may be used for forming cosmetics, a foam structure, or the like.

As a specific example, the foam structure may be prepared from the high internal phase pickering emulsion, and specifically, a method of preparing the foam structure may be carried out by including preparing a high internal phase pickering emulsion including 0.01-20 wt % of particles having an average particle diameter of 10 nm-100 μm, and 0.01-20 wt % of a non-ionic water-soluble polymer based on a total weight of the emulsion, the emulsion having an oil phase being a dispersed phase, and a water phase being a continuous phase, the oil phase being included as a dispersed phase at 74 vol % or more based on the total volume of the emulsion; curing the non-ionic water-soluble polymer in the high internal phase pickering emulsion to be polymerized;

and removing liquid components forming the continuous phase with the dispersed phase in the high internal phase pickering emulsion.

That is, the foam structure may be formed by preparing the high internal phase pickering emulsion first, and then curing the non-ionic water-soluble polymer dissolved in the water phase of the high internal phase pickering emulsion to be polymerized, and removing the liquid component remaining in the polymer. Accordingly, the foam structure may include the polymer compound polymerized from the non-ionic water-soluble polymer, and the particles added for preparing the emulsion. As such, the foam structure may have different physical properties depending on the kind, content and the like of the non-ionic water-soluble polymer and particles, and it is preferred to adjust the physical properties depending on the use of the foam structure.

Therefore, in order to prepare this foam structure, it is preferred that the non-ionic water-soluble polymer contains a polymerizable functional group. By way of example, the non-ionic water-soluble polymer may contain a thermally curable and/or photocurable, polymerizable functional group. Specifically, the thermally curable or photocurable, polymerizable functional group may be an epoxy group, an acryl group, a methacryl group, a vinyl group, an amino group or a hydroxy group, and the non-ionic water-soluble polymer may contain one or two or more of the thermally curable or photocurable functional group. Herein, when two or more polymerizable functional groups are contained, the functional groups may be identical to or different from each other. As a non-limiting specific example, any one or two or more selected from the group consisting of polyethylene glycol diacrylate, polyethylene glycol dimethacrylate, polypropylene glycol diacrylate, polypropylene glycol dimethacrylate and the like may be used, but not limited thereto.

Further, for thermal curing and/or photocuring of the polymerizable functional group, the pickering emulsion may contain a thermal initiator and/or a photoinitiator which is/are generally used depending on the kind of polymerizable functional group, and the physical properties of the foam structure to be prepared may be adjusted by controlling the content thereof. As a non-limiting specific example, the thermal initiator may be a peroxide-based compound, a azo-based compound or the like, and more specifically, any one or two or more selected from the group consisting of 2,2'-azobis(2-methylbutyronitrile), 2,2'-azobis(isobutyronitrile), 2,2'-azobis(2,4-dimethylvaleronitrile) and 2,2'-azobis(4-methoxy-2,4-dimethylvaleronitrile), tetramethylbutyl peroxyneodecanoate, bis(4-butylcyclohexyl) peroxydicarbonate, di(2-ethylhexyl) peroxycarbonate, butyl peroxyneodecanoate, dipropyl peroxydicarbonate, diisopropyl peroxydicarbonate, diethoxyethyl peroxydicarbonate, diethoxyhexyl peroxydicarbonate, hexyl peroxydicarbonate, dimethoxybutyl peroxydicarbonate, bis(3-methoxy-3-methoxybutyl) peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethyl hexanoyl peroxide, dimethyl hydroxybutyl peroxyneodecanoate, amyl peroxyneodecanoate, butyl peroxyneodecanoate, t-butyl peroxyneoheptanoate, amyl peroxypivalate, t-butyl peroxypivalate, t-amyl peroxy-2-ethylhexanoate, lauryl peroxide, dilauroyl peroxide, didecanoyl peroxide, benzoyl peroxide and dibenzoyl peroxide; and the photoinitiator may be a benzoin-based compound, a hydroxy ketone-based compound, an aminoketone-based compound or the like, and more specifically, any one or two or more selected from the group consisting of benzoin, benzoin methyl ether, benzoin ethyl ether, benzoin isopropyl ether, benzoin n-butyl ether, benzoin isobutyl ether, acetophenone, dimethylamino acetophenone, a,a-methoxy-a-hydroxyacetophenone, 2,2-dimethoxy-2-phenyl acetophenone, 2,2-diethoxy-2-phenyl acetophenone, 2-hydroxy-2-methyl-1-phenylpropane-1-one, 1-hydroxycyclohexyl phenyl ketone, 2-methyl-1-[4-(methylthio)phenyl]-2-morpholino-propan-1-one, 4-(2-hydroxyethoxy)phenyl-2-(hydroxy-2-propyl) ketone, benzophenone, 4,4'-diethylaminobenzophenone, dichlorobenzophenone, 2-methyl anthraquinone, 2-ethyl anthraquinone, 2-t-butyl anthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal and oligo[2-hydroxy-2-methyl-1-[4-(1-methylvinyl)phenyl]propanone, but not limited thereto. Further, as a non-limiting specific example, the contents of the thermal initiator and photoinitiator may be 0.001-5 parts by weight, more preferably 0.1-3 parts by weight, based on 100 parts by weight of the non-ionic water-soluble polymer, but not limited thereto.

In addition, of course, for thermal curing or photocuring of the polymerizable functional group, the pickering emulsion may further include a crosslinking agent, a chain extender, a catalyst or the like, which is generally used depending on the kind of polymerizable functional group.

The thus-prepared foam structure may be used as a material of a water treatment filter, or a carrier for preparing a catalyst.

Hereinafter, the method according to the present invention will be described in more detail by the following Examples. However, the following Examples are only a reference for describing the present invention in detail, and the present invention is not limited thereto, and may be implemented in various forms. Further, unless otherwise stated, the unit of added materials may be wt %.

Example 1

100 µl of a solution of silica particles (average particle diameter 1 µm, 10 wt % in water) was centrifuged at 8000 rpm for 5 minutes, and then washed with water. The process was repeated three times, and the surfactant which was added for preventing agglomeration of the silica particles was removed therefrom.

Next, 100 µl of the silica particle solution from which the surfactant was removed (in water, 0.4 wt % in 3 ml of the total volume of water and hexadecane) was added to 300 µl of water (DI water, 18.2 MΩ), and subjected to dispersion again, thereby preparing a dispersion. To the top of this dispersion, 2.4 ml of hexadecane was slowly added, thereby forming a water layer and an oil layer.

Water in which polyethylene glycol (PEG; Mw 10,000 g/mol) is dissolved was added to the water layer using a pipette, with a proviso that after adding water so that 1 wt % of PEG based on the total weight of the water layer is contained in the water layer, the total volume of water is adjusted to be 600 µl, so that the volume ratio of the water layer:the oil layer is 2:8 (600 µl: 2.4 ml). The volume ratio of the oil layer was 2:8 (600 µl: 2.4 ml).

Next, VM-10 (WiseMiX) was used to carry out shaking at 3000 rpm for 45 seconds, thereby obtaining a pickering emulsion in which the water layer and the oil layer are mixed well.

Examples 2 to 7

All processes were carried out in the same manner as Example 1, except that the volume ratio of the water layer and the oil layer is different. Specifically, the volume ratio of the water layer:the oil layer was adjusted to 3:7 in Example 2, 4:6 in Example 3, 5:5 in Example 4, 6:4 in Example 5, 7:3 in Example 6, and 8:2 in Example 7.

Comparative Examples 1 to 7

All processes were carried out in the same manner as Example 1, except that PEG was not contained, and the volume ratio of the water layer and the oil layer was different. Specifically, the volume ratio of the water layer:the oil layer was adjusted to 2:8 in Comparative Example 1, 3:7 in Comparative Example 2, 4:6 in Comparative Example 3, 5:5 in Comparative Example 4, 6:4 in Comparative Example 5, 7:3 in Comparative Example 6, and 8:2 in Comparative Example 7.

Figure 2:
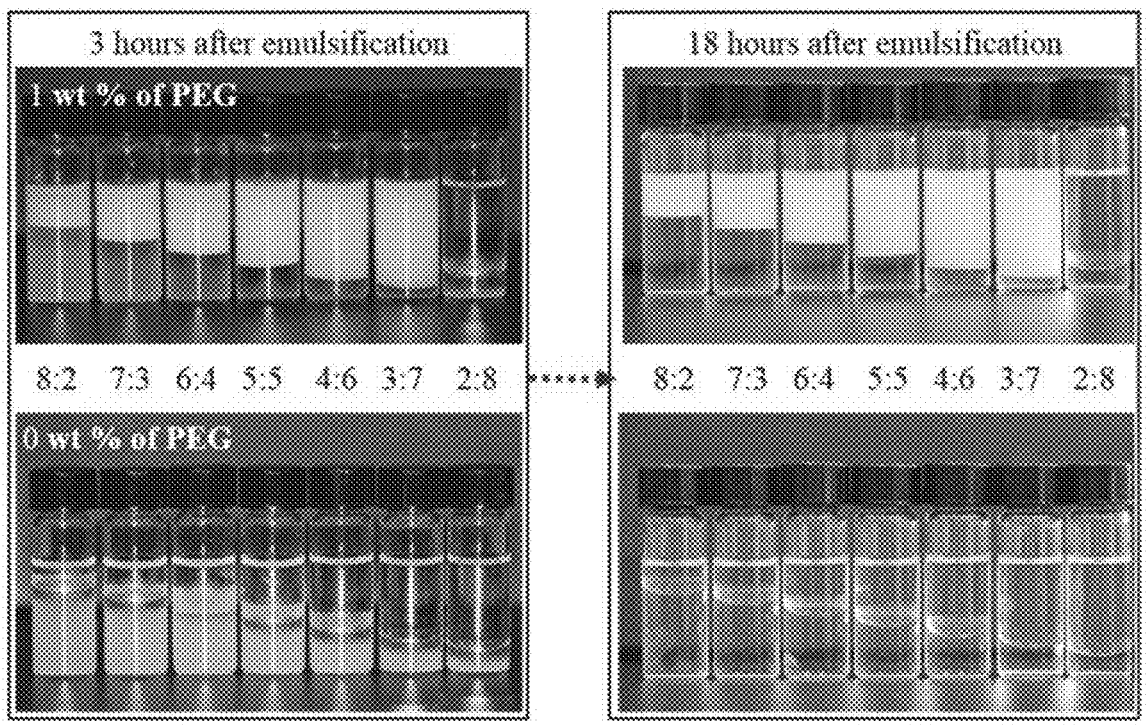
FIG. 2 is photographs taken after testing emulsion safety depending on whether a non-ionic water-soluble polymer is added, and the ratio of an oil phase and a water phase.

Photographs of the pickering emulsion obtained in Examples 1 to 7, and Comparative Examples 1 to 7 are shown in FIG. 2.

As shown in FIG. 2, in Examples 1 to 7 containing 1 wt % of PEG based on the total weight of the water layer, it is confirmed that the dispersed phase was stably maintained 3 hours, and even 18 hours after preparation, which was maintained for a week or more.

However, in case that PEG was not added, it is confirmed that the stability was already lost 3 hours after preparation and phase separation began to occur, and after 18 hours, it is confirmed that phase separation was complete.

As such, the pickering emulsion maintaining long term stability may be obtained by adding particles having an average particle diameter of 1 μm, and PEG which is a non-ionic water-soluble polymer.

Example 8

A primary emulsion was obtained by the same process as Example 2. Next, hexadecane was added so that the volume ratio of the water layer and the oil layer was 2:8, and then VM-10 (WiseMiX) was used to carry out shaking at 3000 rpm for 45 seconds, thereby obtaining a secondary emulsion in which the water layer and the oil layer were mixed well.

To this, hexadecane was added again so that the volume ratio of the water layer and the oil layer was 1.5:8.5, and then VM-10 (WiseMiX) was used to carry out shaking well at 3000 rpm for 45 seconds, thereby obtaining a high internal phase pickering emulsion, and the confocal micrograph thereof is identified by B of FIG. 3.

As identified by B of FIG. 3, it is confirmed that in case that the oil phase was further added to the primarily prepared emulsion and mixed, the oil phase was very stably formed, thereby possessing a solid property having very low flowability, and the oil phase fully occupied the emulsion, so that each spacing between oil droplets became narrow, so that pressure was applied therebetween, thereby transforming the shape of the oil droplets into an angular shape.

However, A of FIG. 3 is the confocal micrograph of the pickering emulsion according to Example 2, and as identified by A of FIG. 3, it is confirmed that though the emulsion had a stable dispersed phase, the high internal phase pickering emulsion having solid properties was not prepared.

Example 9

Figure 4:
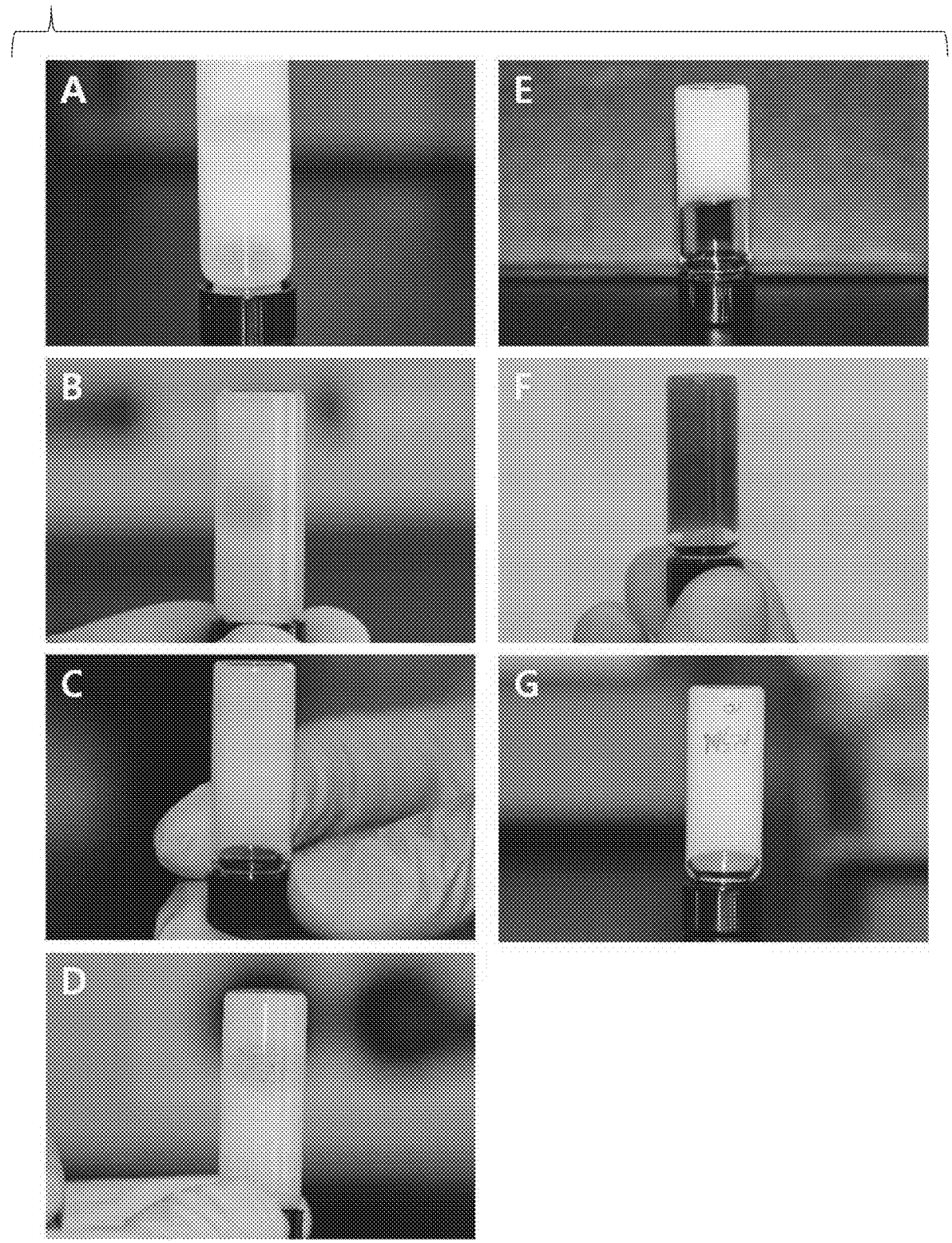
FIG. 4 is photographs of high internal phase pickering emulsions according to exemplary embodiments of the present invention.

All processes were carried out in the same manner as in Example 8, except that the size of the silica particles was 0.5 μm, thereby obtaining a high internal phase emulsion, and the photograph thereof is identified by A of FIG. 4.

Example 10

All processes were carried out in the same manner as in Example 8, except that the average particle diameter of the silica particles was 3 μm, and the content of the silica particles was 1.2 wt % in 3 ml of the total volume of water and hexadecane in the primary emulsion, thereby obtaining a high internal phase emulsion, and the photograph thereof is identified by B of FIG. 4.

Example 11

All processes were carried out in the same manner as in Example 8, except that two kinds of the silica particles were prepared, one having an average particle diameter of 0.6 μm, and the other having an average particle diameter of 20 μm, and they were mixed in a volume ratio of 1:1, and the content thereof was 0.67 wt % in 3 ml of the total volume of water and hexadecane in the primary emulsion, thereby obtaining a high internal phase emulsion, and the photograph thereof is identified by C of FIG. 4.

Example 12

All processes were carried out in the same manner as in Example 8, except that polydispersed silica particles having a particle diameter of 80-100 μm were prepared, and the content thereof was 2 wt % in 3 ml of the total volume of water and hexadecane in the primary emulsion, thereby obtaining a high internal phase emulsion, and the photograph thereof is identified by D of FIG. 4.

Example 13

All processes were carried out in the same manner as in Example 8, except that polystyrene particles (Bangs Laboratories Inc., PCO4N) having an average particle diameter of 1 μm were used, instead of the silica particles having an average particle diameter of 1 μm, thereby obtaining a high internal phase emulsion, and the photograph thereof is identified by E of FIG. 4.

Example 14

All processes were carried out in the same manner as in Example 8, except that copper particles having an average particle diameter of 0.07 μm were used, and the content thereof was 0.2 wt % in 3 ml of the total volume of water and hexadecane in the primary emulsion, thereby obtaining a high internal phase emulsion, and the photograph thereof is identified by F of FIG. 4.

Example 15

All processes were carried out in the same manner as in Example 8, except that polyethylene glycol diacrylate (PEGDA; Mw 700 g/mol) was used instead of PEG, and added so that 10 wt % of PEGDA based on the total weight of the water layer was contained in the water layer, thereby obtaining a high internal phase emulsion, and the photograph thereof is identified by G of FIG. 4.

As seen from Examples 1 to 15, according to an exemplary embodiment of the present invention, a high internal phase pickering emulsion having excellent stability may be prepared by a very simple method of mixing only a water phase, an oil phase, particles and a non-ionic water-soluble polymer. Further, the particles used herein are pure without being subjected to surface treatment or special preparation, and any solid particles may be used as the particles without limiting the kind thereof, and thus, they may be very advantageous in the price aspect.

The invention claimed is:

1. A pickering emulsion comprising:
    0.01-20 wt % of metal or non-metal particles having an average particle diameter of 10 nm-100 μm and being not surface-treated, and 0.01-20 wt % of a non-ionic water-soluble polymer, based on a total weight of the emulsion, wherein the particles are positioned on an oil droplet surface,
    wherein the emulsion does not comprise a surfactant,
    wherein an oil phase of the pickering emulsion is a dispersed phase, a water phase of the pickering emulsion is a continuous phase and comprises the non-ionic water-soluble polymer and water, and the oil phase accounts for 74 vol % or more, based on a total volume of the emulsion,
    wherein the non-ionic water-soluble polymer has a weight average molecular weight of 100-30,000 g/mol and is any one or two or more selected from the group consisting of polyethylene glycol, polyethylene propylene glycol, polyoxypropylene glycol, polyethylene glycol diacrylate, polyethylene glycol dimethyl ether, polyvinyl alcohol and polyacrylamide, and
    wherein the metal particles are any one or two or more selected from the group consisting of Groups 3 to 12 transition metal particles, Groups 13 to 16 post-transition metal particles and oxides thereof, and the non-metal particles are any one or two or more selected from the group consisting of polystyrene particles, polycarbonate particles, polyamide particles, polyimide particles, polyurethane particles, silica particles, solid glass particles, and ceramic particles.

2. The pickering emulsion of claim 1, wherein the transition metal of the transition metal particles is titanium (Ti), vanadium (V), manganese (Mn), iron (Fe), cobalt (Co), nickel (Ni), copper (Cu), niobium (Nb), molybdenum (Mo), ruthenium (Ru), rhodium (Rh), palladium (Pd), silver (Ag), hafnium (Hf), tantalum (Ta), tungsten (W), iridium (Ir), platinum (Pt), gold (Au), lanthanum (La) or cerium (Ce), and the post-transition metal of the post-transition metal particles is aluminum (Al), gallium (Ga), indium (In), tin (Sn), thallium (Tl), lead (Pb) or bismuth (Bi).

3. The pickering emulsion of claim 1, wherein the non-ionic water-soluble polymer has a weight average molecular weight of 100-10,000 g/mol.

4. A method of preparing the pickering emulsion of claim 1 comprising:
    a) dispersing metal or non-metal particles having an average particle diameter of 10 nm-100 μm and being not surface-treated in a water phase to prepare a dispersion;
    b) adding an oil phase and a non-ionic water-soluble polymer to the dispersion to prepare a secondary dispersion; and
    c) mixing the secondary dispersion to prepare the pickering emulsion of claim 1,
    wherein the non-ionic water-soluble polymer has a weight average molecular weight of 100-30,000 g/mol and is any one or two or more selected from the group consisting of polyethylene glycol, polyethylene propylene glycol, polyoxypropylene glycol, polyethylene glycol diacrylate, polyethylene glycol dimethyl ether, polyvinyl alcohol and polyacrylamide, and
    wherein the metal particles are any one or two or more selected from the group consisting of Groups 3 to 12 transition metal particles, Groups 13 to 16 post-transition metal particles and oxides thereof, and the non-metal particles are any one or two or more selected from the group consisting of polystyrene particles, polycarbonate particles, polyamide particles, polyimide particles, polyurethane particles, silica particles, solid glass particles and ceramic particles.

5. The method of claim 4, further comprising:
    d) additionally adding an additional amount of the oil phase to the emulsion and carrying out mixing, once or twice or more.

6. A method of preparing a foam structure comprising:
    preparing the pickering emulsion of claim 1;
    curing the non-ionic water-soluble polymer in the pickering emulsion to be polymerized; and
    removing liquid components forming the continuous phase and the dispersed phase in the pickering emulsion.

7. A foam structure prepared by the method of claim 6.

* * * * *